United States Patent
Kosmehl et al.

(10) Patent No.: US 11,112,013 B2
(45) Date of Patent: Sep. 7, 2021

(54) TANK VALVE AND TANK WITH SUCH A VALVE

(71) Applicant: Leinemann GmbH & Co. KG, Braunschweig (DE)

(72) Inventors: Ralf Kosmehl, Lehrte (DE); Frank Helmsen, Peine (DE); Thomas Heidermann, Didderse (DE); Thorsten Schaper, Braunschweig (DE); Michael Davies, Hildesheim (DE)

(73) Assignee: LEINEMANN GMBH & CO. KG, Braunschweig (DE)

( * ) Notice: Subject to any disclaimer, the term of this patent is extended or adjusted under 35 U.S.C. 154(b) by 0 days.

(21) Appl. No.: 16/433,070

(22) Filed: Jun. 6, 2019

(65) Prior Publication Data

US 2019/0376604 A1   Dec. 12, 2019

(30) Foreign Application Priority Data

Jun. 8, 2018   (DE) .................... 10 2018 113 748.6

(51) Int. Cl.
| | |
|---|---|
| *F16K 1/44* | (2006.01) |
| *F16K 3/08* | (2006.01) |
| *F16K 3/30* | (2006.01) |
| *F16K 17/38* | (2006.01) |
| *F16K 27/07* | (2006.01) |
| *F17C 13/00* | (2006.01) |
| *B65D 90/54* | (2006.01) |

(Continued)

(52) U.S. Cl.
CPC ............... *F16K 3/085* (2013.01); *F16K 1/44* (2013.01); *F16K 3/30* (2013.01); *F16K 17/38* (2013.01); *F16K 27/07* (2013.01); *B65D 90/54* (2013.01); *F16K 39/02* (2013.01); *F17C 13/00* (2013.01); *F17C 13/04* (2013.01); *F17C 2221/014* (2013.01); *F17C 2221/016* (2013.01)

(58) Field of Classification Search
CPC .... F17C 13/04; F17C 13/00; F17C 2221/014; F17C 2221/016; F16K 39/02; F16K 1/44; F16K 27/07; B65D 90/54
See application file for complete search history.

(56) References Cited

U.S. PATENT DOCUMENTS

| | | | |
|---|---|---|---|
| 289,954 A | * | 12/1883 | Badger ............... F16K 1/44 |
| | | | 137/625.35 |
| 3,981,325 A | | 9/1976 | Robinson et al. |
| 4,009,862 A | | 3/1977 | Defrees |

(Continued)

FOREIGN PATENT DOCUMENTS

| | | |
|---|---|---|
| CN | 204 358 117 U | 5/2015 |
| CN | 204358117 U | 5/2015 |

(Continued)

*Primary Examiner* — Matthew W Jellett
*Assistant Examiner* — Christopher D Ballman
(74) *Attorney, Agent, or Firm* — W&C IP (57) ABSTRACT

A tank valve with a valve seat and a valve disc can be displaced relative to the valve seat along a displacement direction into either a closed position or a through-flow position. The valve seat includes a plate shaped part and a ring-shaped part. The valve disc has a first contact area which contacts the first plate shaped part of the valve seat when the tank valve is in the closed position. The valve disc also has a second contact area which is in contact with a second part of the valve seat when it is in the closed position.

14 Claims, 6 Drawing Sheets

(51) Int. Cl.
*F16K 39/02* (2006.01)
*F17C 13/04* (2006.01)

(56) References Cited

U.S. PATENT DOCUMENTS

| | | | | |
|---|---|---|---|---|
| 4,437,487 A | * | 3/1984 | Marmon | F16K 15/18 137/322 |
| 4,494,570 A | * | 1/1985 | Adkins | F17C 13/04 137/517 |
| 4,676,266 A | | 6/1987 | Johnson | |
| 4,699,351 A | * | 10/1987 | Wells | F16K 31/408 251/29 |
| 4,777,975 A | | 10/1988 | Strangefeld | |
| 5,271,599 A | * | 12/1993 | Kolchinsky | F16K 31/408 251/30.01 |
| 5,390,703 A | * | 2/1995 | Tengesdal | F16K 1/44 137/629 |
| 6,612,338 B2 | * | 9/2003 | Weldon | F16K 1/44 137/529 |
| 6,752,377 B1 | * | 6/2004 | Taylor | F16K 17/04 251/360 |
| 6,981,514 B2 | * | 1/2006 | Nishi | F16K 24/042 137/202 |
| 7,188,613 B2 | * | 3/2007 | Miura | F16K 24/044 123/198 D |
| 7,219,695 B2 | * | 5/2007 | Pechtold | F16K 1/302 137/625.33 |
| 7,730,905 B2 | * | 6/2010 | Suzuki | F17C 13/04 137/613 |
| 8,646,478 B2 | | 2/2014 | Nunez et al. | |
| 9,151,354 B2 | * | 10/2015 | Ewers | F16F 9/464 |
| 9,333,851 B2 | * | 5/2016 | Miura | B60K 15/03519 |
| 9,360,127 B2 | * | 6/2016 | Helmsen | F16K 1/36 |
| 9,599,237 B2 | * | 3/2017 | Larsen | F16K 11/044 |
| 9,683,429 B2 | * | 6/2017 | Mathiesen | E21B 34/14 |
| 9,903,318 B2 | * | 2/2018 | Mihara | F16K 24/044 |
| 10,161,360 B2 | * | 12/2018 | Ninomiya | F16K 31/42 |
| 10,302,216 B2 | * | 5/2019 | Hausmann | F16K 31/0675 |
| 10,641,397 B2 | * | 5/2020 | Bjerrehorn | F16K 1/42 |
| 2004/0045539 A1 | * | 3/2004 | Furuta | F02M 21/0233 123/529 |
| 2009/0288735 A1 | * | 11/2009 | Hirata | F16K 31/22 141/198 |
| 2010/0107669 A1 | * | 5/2010 | Wada | F25B 41/04 62/196.1 |
| 2013/0075394 A1 | * | 3/2013 | Suzuki | B60K 15/035 220/86.2 |
| 2015/0068617 A1 | * | 3/2015 | Shimokawa | F16K 24/044 137/409 |

FOREIGN PATENT DOCUMENTS

| | | |
|---|---|---|
| DE | 291 099 C | 4/1916 |
| EP | 0 645 562 A1 | 3/1995 |
| EP | 0645562 A1 | 3/1995 |
| EP | 1 870 620 A | 12/2007 |
| WO | 2012/109799 A1 | 8/2012 |
| WO | 2017/137961 A1 | 8/2017 |

* cited by examiner

TANK VALVE AND TANK WITH SUCH A VALVE

FIELD OF THE INVENTION

The invention relates to a tank valve with a valve seat and a valve disc, which can be displaced relative to the valve seat in a displacement direction into a closed position, in which the tank valve is closed, and into a through-flow position. The invention also relates to a tank for liquefied gases that features such a valve.

BACKGROUND

Nowadays liquefied gases, such as liquefied nitrogen, liquefied ammoniac, liquefied argon and other gases are used in a number of different technical, industrial and other applications. They are stored below their boiling temperature in tanks, which may have a capacity of several hundred cubic meters. On their lower side or in the lower area of their lateral wall, these tanks often feature at least one discharge pipe, through which the liquid gas can be drained as necessary. The inner end of this discharge pipe is located on the inside of the tank volume, said inner end being equipped with a tank valve. If the discharge pipe outside of the tank is damaged or becomes damaged, the valve can be closed to prevent an uncontrolled escape of the liquid gas.

Generally speaking, the tank valve refers to a valve which has a ring-shaped valve seat and a plate-shaped valve disc. In the context of the present invention, a valve seat should be understood to mean an immovable part of the valve, whereas the valve disc is designed such that it can be moved relative to the valve seat. It can be removed from the valve seat and is then in a through-flow position, in which the tank valve is open. The valve disc can also be moved in the opposite direction until it lies flat on the valve seat, thereby closing the tank valve. This type of tank valve is known from DE 10 2013 110 619 B3, for instance, or DE 20 2015 104 520 U1.

In order to bring the valve disc of the tank valve out of the closed position into the through-flow position, and to keep it in this position, a traction device, such as a traction cable, is provided, said traction device leading to the roof of the tank. The end of the traction cable is often fixed to the outside of the tank by way of pneumatics or hydraulics; this keeps the valve disc of the tank valve in the through-flow position.

Given that the discharge pipe is located in the base or in the lower area of the lateral wall of the tank, it is generally surrounded by liquefied gas and not accessible. The tank valve must therefore work at correspondingly low temperatures.

If a tank valve from the prior art is to be closed, it is often enough to release the locking mechanism of the traction cable on the roof of the tank; as a result, due to the gravity and hydrostatic pressure of the liquid gas acting on it, the valve disc moves downwards and into the closed position. In this case, a considerable pressure difference emerges between the area above the valve disc and below the valve disc, especially towards the end of the stroke path, where the valve opening between the valve disc and the valve seat becomes increasingly smaller; as a result, a strong force acts on the valve disc, which accelerates it further and further towards the valve seat. The valve disc strikes the valve seat unbraked, wherein the hydrostatic pressure of the liquid gas arranged above acts on said valve seat. This may correspond to a weight of several tons. On the one hand, the valve disc must therefore be designed in such a way that it withstands the impact on the valve seat undamaged and, on the other hand, it can be brought out of the closed position back into the through-flow position by the traction device. To this end, the traction device must overcome the hydrostatic pressure of the liquid gas, such that a tensile force must be applied which is strong enough to lift several tons. This force must be introduced into the roof of the tank, the design of which must therefore be very stable.

SUMMARY

The invention aims to improve a tank valve of the type described here such that these disadvantages are mitigated.

The invention solves the task at hand by way of a tank valve according to the generic term in claim 1, which is characterized by the fact that the valve seat comprises a first plate-shaped part and a second ring-shaped part, and the valve disc comprises a first contact area, which is in contact with the first part when in the closed position, and a second contact area, which is in contact with the second part of the valve seat when in the closed position.

The ring-shaped second part of the valve seat corresponds to the valve seat from the prior art. It encloses an outflow opening that, once the tank valve has been assembled, is connected to a discharge pipe of the tank. The medium that is stored in the tank can leave the tank through this second ring-shaped part of the valve seat. Here, ring-shaped does not necessarily mean circular. Of course, the second part may also be designed as an oval or another shape. The contact between the second part of the valve seat and the second contact area of the valve disc preferably occurs along a closed contour.

The contact between the first contact area of the valve disc and the plate-shaped first part of the valve seat also occurs along a closed contour, such as a ring or a circular ring. The fact that the first part of the valve seat is plate-formed preferably only means that the area within this contour features no or almost no openings.

The invention is based on the knowledge that the previously described disadvantages exhibited by tank valves from the prior art are caused by the relatively large surface of the valve disc, which extends perpendicular to the direction of displacement. The hydrostatic pressure acts on this surface in the direction of movement or in the opposite direction, wherein said hydrostatic pressure must be overcome to open the valve, i.e. to move the valve disc out of the closed position into the through-flow opening, and—in the case of a movement in the opposite direction—is responsible for the great force that acts on the valve disc. However, the invention proposes that this surface, which is still needed to completely close the valve, is part of the valve seat and forms the first plate-shaped part. This ensures that the valve disc itself is no longer designed to be plate-shaped, wherein it is still referred to as a valve disc. The surface of the valve disc according to the invention that is projected in the direction of movement is considerably smaller in relation to valve discs from the prior art, which reduces the disadvantages of the prior art.

The valve disc preferably features a tubular casing, which connects the first contact area with the second contact area. Here, the second contact area is preferably situated at one end of the tubular casing. When the valve disc is in the closed position, this second contact area lies flat on the second ring-shaped part of the valve seat. If the valve disc is displaced out of this closed position into the through-flow position, a distance between the second contact area and the second ring-shaped part of the valve seat increases and a through-flow gap preferably emerges, through which the majority of the medium flowing through the ring-shaped second part of the valve seat enters the valve.

The first contact area is preferably arranged on an end of the casing that is folded inwards. In this area, the casing is thus designed with a u-shaped cross-section, wherein one side of the U, preferably the radially outer side, is designed to be considerably longer than the radially inner side. The second contact area is preferably located on the end of the radially outer side, whereas the first contact area is arranged on the end that is folded inwards, i.e. the radially inner side.

Alternatively, the first contact area may also be arranged on a projection of the casing that protrudes radially inwards, said projection extending across the entire circumference of the casing. One end of the valve disc may feature, for example, a reduced cross-section, because, for instance, a projection protrudes radially inwards, said projection coming into contact with the plate-shaped part of the valve seat when the valve closes.

The surface of the valve plate that is projected in the direction of displacement, wherein the hydrostatic pressure acts on said surface in the direction of movement, is therefore fundamentally determined by the area of the casing that is folded in. If one assumes a u-shaped cross-section, this corresponds to the curved part of the U between the two sides. If the casing has an otherwise constant cross-section across its length, this surface that is projected in the direction of movement is exclusively this part of the casing.

The casing preferably tapers in the direction of displacement. On the one hand, this ensures that the first contact area and the second contact area have the same diameter. Preferably, both are designed to be circular. Here, the tapering of the casing preferably occurs towards the closed position of the valve disc. In this case, the diameter of the casing is at its smallest in the region of the second contact area, said diameter increasing along the direction of movement until it reaches its maximum width, which is preferably reached directly at the inwardly folded end of the casing. As a result of this tapering or, in the opposite direction observed, expansion of the cross-section, the surface that is projected in the direction of movement, on which the hydrostatic pressure acts in the direction of movement, is further reduced. Given that, going from the second contact area, this refers to an expansion of the cross-section, i.e. a type of overhang, the hydrostatic pressure on this area and the inwardly folded area of the casing acts in precisely opposite directions, such that it is at least partially, but preferably fully, counterbalanced.

If the casing in this configuration is moved towards the closed position in the direction of displacement, the first contact area comes into contact with the first plate-shaped part and the second contact area with the second ring-shaped part of the valve seat. The two contact areas thereby move closer to their respective part of the valve seat from the same direction.

The casing preferably has at least one elastic area in the direction of displacement, in particular in the form of bellows, wherein this elastic area is preferably situated at the end of the casing that is folded inwards. Alternatively or additionally, an elastic area in the direction of displacement is arranged on the outer part of the casing.

When the valve closes, the first contact area comes into contact with the first plate-shaped part and the second contact area with the second ring-shaped part. The elastic area in the direction of displacement is provided to compensate for any production tolerances, inaccuracies or other deviations from the exact shape of the valve disc and/or the valve seat. It is especially preferable if the area in the form of bellows is made of steel, preferably stainless steel. This ensures that even at low and the lowest temperatures which occur during the use of liquefied gases, a functionality of the valve remains safeguarded.

The first part and the second part of the valve seat are preferably arranged at a distance from one another along the direction of displacement.

The first part and the second part of the valve seat preferably have the same outer diameter perpendicular to the direction of displacement.

The tank valve is preferably designed to be operated at temperatures of below −50° C., preferably below −100° C., especially preferably below −160° C. The tank valve preferably does not feature any soft seal elements in the form of elastomers, as they do not produce their sealing effect at the given temperatures.

The invention also solves the task at hand by way of a tank for liquefied gases, wherein the tank comprises at least one tank volume and at least one discharge pipe, and is characterized by the fact that a tank valve as described here is arranged at one end of the discharge pipe, which is situated inside the tank volume. By using this type of tank valve, as described above, the force acting on the valve disc, which is produced by the hydrostatic pressure and pushes the valve disc into the closed position, is considerably reduced, so that the force required to open the tank valve is also considerably smaller.

The valve disc of the tank valve can preferably be displaced by a traction device, which is arranged on a roof of the tank. This is generally known from the prior art. Given that the use of the tank valve described here enables a considerable reduction in the force required to open the valve, the roof of the tank, which acts as a counter-bearing for the force required to open the valve, can be designed to be lighter and therefore cheaper.

The materials that are responsible for tightness of the tank valve, in particular the material of the contact areas of the valve disc and the material of the parts of the valve seat that can come into contact with the contact areas are preferably metallic; it is especially preferable if they are made of steel, particularly stainless steel. However, elastic elements are also conceivable, as long as the materials guarantee the desired tightness at the temperatures that are to be expected.

DESCRIPTION OF THE DRAWINGS

In the following, two examples of an embodiment of the present invention will be explained in more detail by way of the attached drawings: They show.

DETAILED DESCRIPTION

Figure 1:
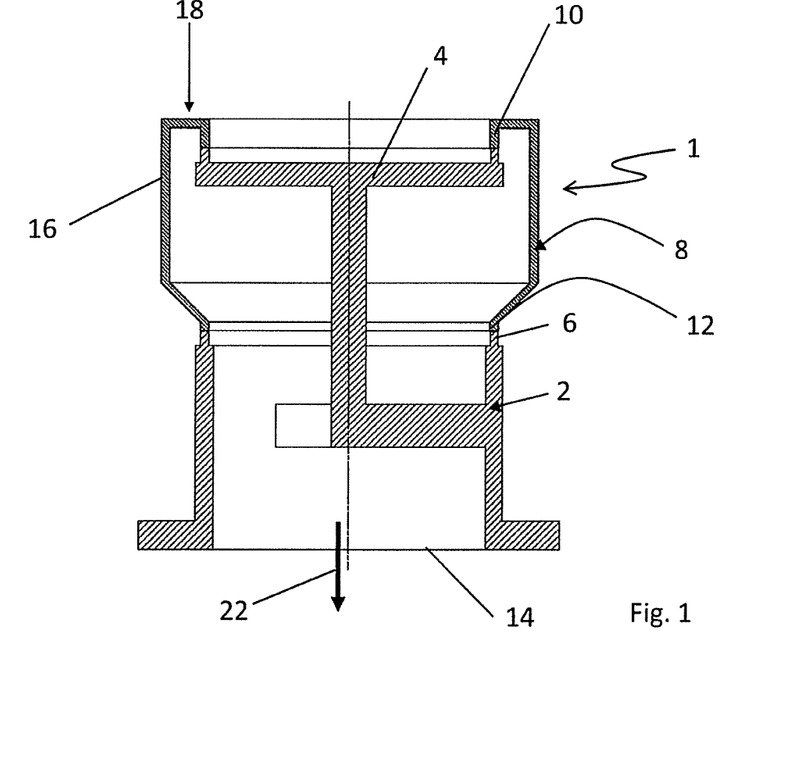
FIGS. 1 to 3—the schematic sectional view through a valve according to a first example of an embodiment of the present invention in different positions, and FIGS. 4 to 6—the schematic sectional views from FIGS. 1 to 3 for a valve according to a second example of an embodiment of the present invention.

FIG. 1 depicts a schematic sectional view through a tank valve 1 according to a first example of an embodiment of the invention. It comprises a valve seat 2, which has a first plate-shaped part 4 and a second ring-shaped part 6. The tank valve 1 also has a valve disc 8, which features a first contact area 10 and a second contact area 12.

In FIG. 1, the tank valve 1 is shown in the closed position. The first contact area 10 lies flat on the first part 4 of the valve seat 2 and the second part 6 of the valve disc 8 lies flat on the second part 6 of the valve seat 2. The valve is closed. An outlet opening 14, through which a medium can flow through the valve in the direction of the arrow 22 when the valve is open, is upwards completely closed.

The valve disc 8 comprises a casing 16, which connects the first contact area 10 and the second contact area 12 to one another and features an inwardly folded end 18 in its upper area. The first contact area 10 is situated on this inwardly folded end.

If the tank valve 1 is installed in a tank, the pressure of the liquefied gas inside the tank generally acts from above; tank valves from the prior art must be opened against said pressure. Unlike valves from the prior art, with a tank valve 1 according to the present invention the pressure of the liquefied gas predominantly pushes on the first part 4 of the valve seat. The pressure from above only acts on the inwardly folded part of the inwardly folded end 18.

Figure 2:
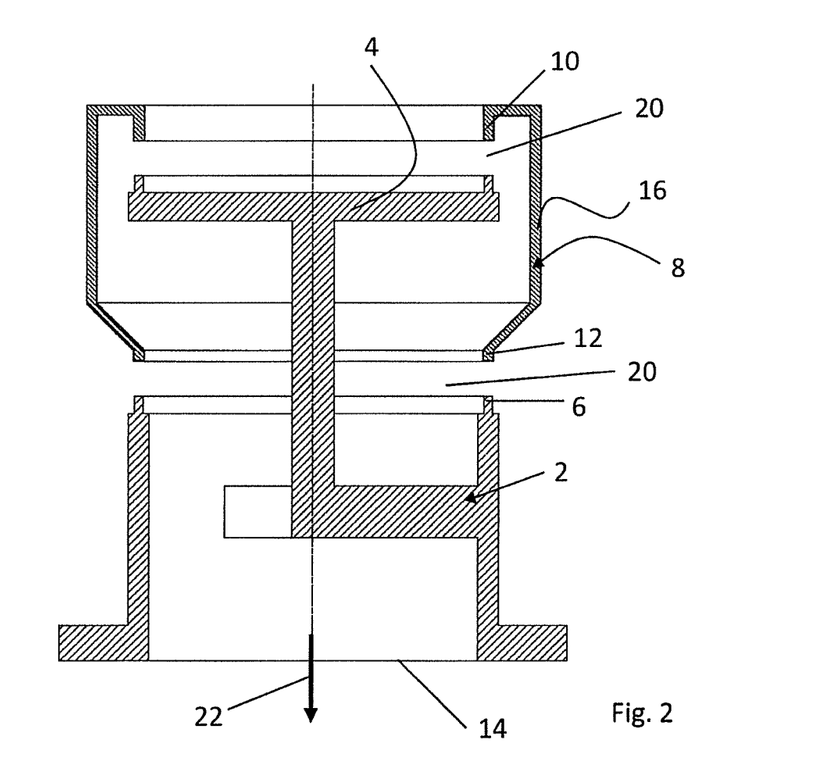
Figure 3:
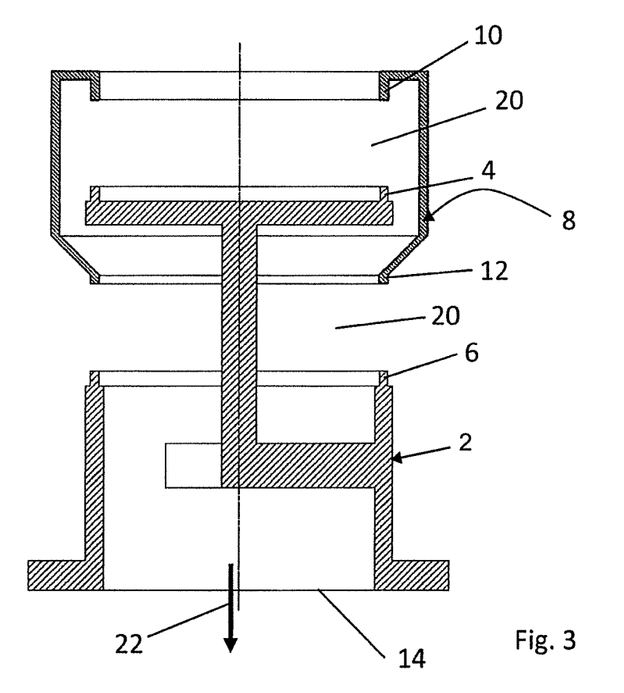

In the embodiment of the tank valve 1 depicted in FIGS. 1 to 3, the casing 16 features a tapering towards the first contact area 12. The surface of the valve disc 8 that is projected in the direction of movement of the valve disc 8 from the closed position into the through-flow position therefore comprises two parts. One is the part that is created as a result of the inwardly folded of the casing 16 in FIGS. 1 to 3. The other is the part that is created by the cross-sectional tapering of the casing 16. Given that one force from the hydrostatic pressure that is acting on these surface parts in the direction of displacement is doing so in a downward direction and the other in an upward direction, they at least partially counterbalance one another; in the example of an embodiment shown, they fully counterbalance one another.

FIG. 2 shows the valve from FIG. 1 in a slightly opened position. One can recognize a gap 20 between the first part 4 of the valve seat 2 and the first contact area 10 of the valve disc 8, as well as between the second part 6 of the valve seat 2 and the second contact surface 12 of the valve disc 8, wherein the medium can enter the valve through said gap, said medium then leaving the valve through the outlet opening 14 along the arrow 22. It is clear to see that the valve disc 8 in the diagrams shown is moved upwards to open the valve. The largest surface of the valve disc 8 that is subjected to pressure is the casing 16, which extends parallel to the direction of movement. The pressure acting on the casing 16 therefore acts perpendicular to the direction of movement and barely impairs the movement.

FIG. 3 shows the valve in the fully open position.

In FIGS. 1 to 3, both the first contact area 10 and the second contact area 12 are designed to be ring-shaped, wherein the two contact areas 10, 12 have the same diameter. This is not the case in the valve depicted in diagrams 4 to 6. In the embodiments shown, the casing 16 of the valve disc 8 extends vertically upwards and does not feature the overhang of the valve disc 8 in FIGS. 1 to 3.

Figure 4:
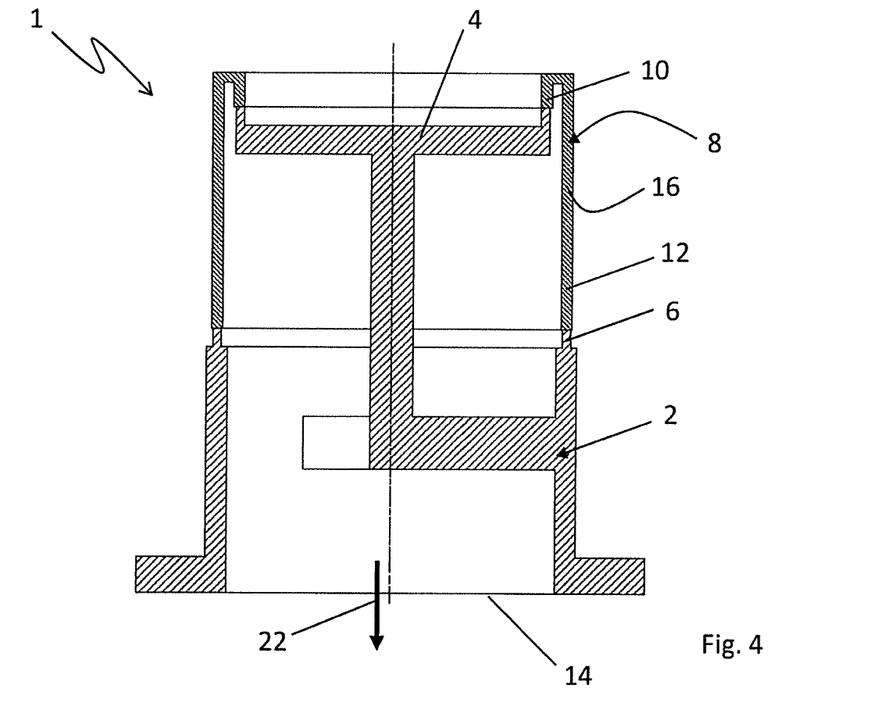
Figure 5:
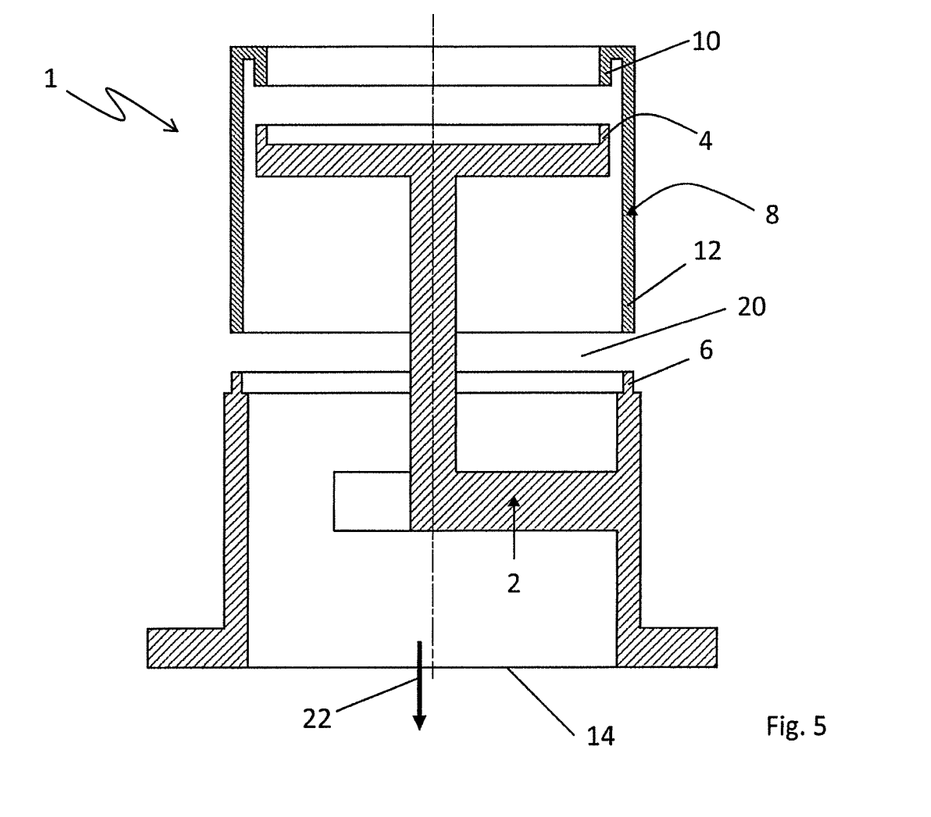
Figure 6:
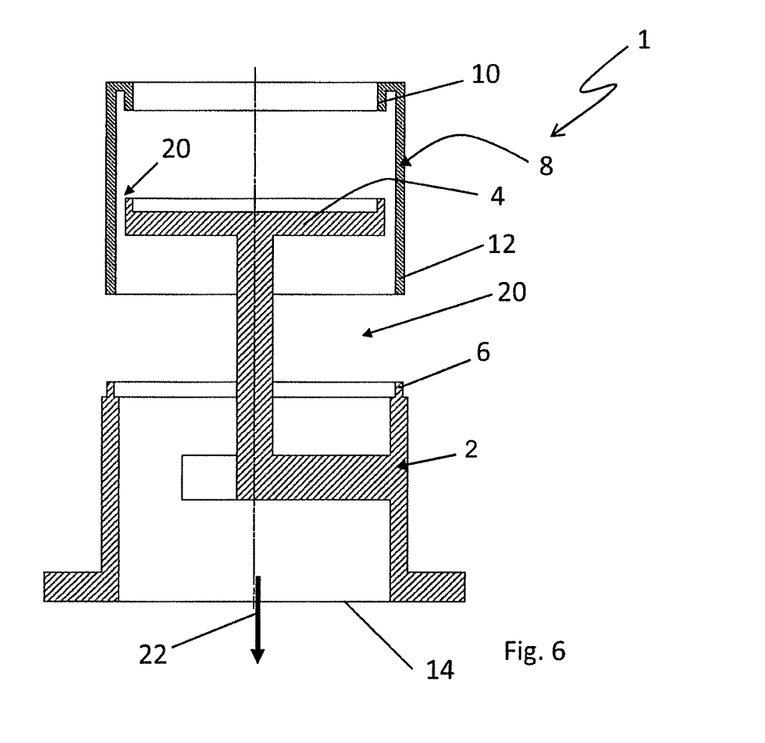

FIGS. 5 and 6 depict the valve from FIG. 4 in a slightly open and in the fully open position.

REFERENCE LIST 1 tank valve
2 valve seat
4 first plate-shaped part
6 second ring-shaped part
8 valve disc
10 first contact area
12 second contact area
14 outlet opening
16 casing
18 inwardly folded end
20 gap
22 arrow

The invention claimed is:

1. A tank valve, comprising:
   a valve seat comprising a first part that is plate-shaped, and a second part that is ring-shaped; and
   a valve disc displaceable relative to the valve seat along a displacement direction to either a closed position where the tank valve is closed or to a through-flow position where the tank valve is open, wherein the valve disc is configured to be displaceable to the closed position by a force from hydrostatic pressure pushing on the valve disc;
   wherein the valve disc comprises a first contact area which is in contact with the first part of the valve seat when the tank valve is in in the closed position,
   wherein the valve disc comprises a second contact area which is in contact with the second part of the valve seat when the tank valve is in the closed position, and
   wherein the first part of the valve seat is positioned above the second part of the valve seat.

2. The tank valve according to claim 1, wherein the valve disc comprises a tubular casing which connects the first contact area of the valve disc with the second contact area of the valve disc.

3. The tank valve according to claim 2 wherein the first contact area of the valve disc is arranged on an inwardly folded end of the casing.

4. The tank valve according to claim 2 wherein the casing tapers in the direction of displacement.

5. The tank valve according to claim 2 wherein the casing has at least one elastic area in the direction of displacement.

6. The tank valve of claim 5 wherein the at least one elastic area is situated at an end of the casing that is inwardly folded.

7. The tank valve according to claim 1 wherein the first part and the second part of the valve seat are situated at a distance from one another along the direction of displacement.

8. The tank valve according to claim 1 wherein the first part and the second part of the valve seat have a same outer diameter perpendicular to the direction of displacement.

9. The tank valve according to claim 1 wherein the tank valve is configured to be operated at temperatures below −50° C.

10. The tank valve according to claim 1 wherein the tank valve is configured to be operated at temperatures below −100° C.

11. The tank valve according to claim 1 wherein the tank valve is configured to be operated at temperatures below −160° C.

12. A tank for liquefied gases, comprising:
    at least one tank volume;
    a tank valve situated inside the tank volume, wherein the tank valve comprises
    a valve seat comprising a first part that is plate-shaped, and a second part that is ring-shaped; and
    a valve disc displaceable relative to the valve seat along a displacement direction to either a closed position where the tank valve is closed or to a through-flow position where the tank valve is open, wherein the valve disc is configured to be displaceable to the closed position by a force from hydrostatic pressure pushing on the valve disc;

wherein the valve disc comprises a first contact area which is in contact with the first part of the valve seat when the tank valve is in in the closed position, wherein the valve disc comprises a second contact area which is in contact with the second part of the valve seat when the tank valve is in the closed position, and wherein the first part of the valve seat is positioned above the second part of the valve seat.

13. The tank according to claim 12, wherein the valve disc of the tank valve is displaceable by both the force from hydrostatic pressure and a traction force.

14. A tank valve, comprising:

a valve seat comprising a first part that is plate-shaped, and a second part that is ring-shaped; and a valve disc displaceable relative to the valve seat along a displacement direction to either a closed position where the tank valve is closed or to a through-flow position where the tank valve is open, wherein the valve disc is configured to be displaceable to the closed position by a force from hydrostatic pressure pushing on the valve disc in an absence of a traction force;

wherein the valve disc comprises a first contact area which is in contact with the first part of the valve seat when the tank valve is in in the closed position, wherein the valve disc comprises a second contact area which is in contact with the second part of the valve seat when the tank valve is in the closed position, and wherein the first part of the valve seat is positioned above the second part of the valve seat.

* * * * *